United States Patent [19]

Spruiell

[11] 4,431,535

[45] Feb. 14, 1984

[54] CENTRIFUGAL SEPARATOR SYSTEM

[76] Inventor: Walter L. Spruiell, P.O. Box 403, Iowa Park, Tex. 76367

[21] Appl. No.: 389,485

[22] Filed: Jun. 17, 1982

[51] Int. Cl.[3] ............................................ B01D 23/20

[52] U.S. Cl. ................................ 210/113; 210/512.1; 55/432

[58] Field of Search ............ 210/112, 113, 788, 512.1, 210/111, 120, 787, 137, 808, 117, 90, 93; 55/432; 209/211, 144; 137/526, 527, 527.8, 527.4

[56] References Cited

U.S. PATENT DOCUMENTS

| | | | |
|---|---|---|---|
| 2,806,599 | 9/1957 | Patrick | 210/512.1 |
| 3,213,879 | 10/1965 | Thompson | 210/113 |
| 3,243,043 | 3/1966 | Thompson et al. | 210/788 |
| 3,546,854 | 12/1970 | Muller | 210/512.1 |

*Primary Examiner*—Peter A. Hruskoci
*Assistant Examiner*—Wanda L. Millard
*Attorney, Agent, or Firm*—Stephen D. Carver

[57] ABSTRACT

A centrifugal separator system for use in purifying drilling mud comprises a generally conical centrifugal separator into which drilling mud to be cleaned is introduced under pressure tangentially to cause centrifugal material flow. A vacuum generated within the center of the separator in response to centrifugal material movement draws lighter cleaned mud and drilling fluid upwardly to a discharge pipe which may lead to a remote drilling mud location. Heavier solids cleansed from the mud drop to the bottom of the centrifuge, settling on an output orifice closure valve. The valve is pivotally connected to the centrifuge whereby to close the output orifice unit a preselected weight of material accumulates thereon. In order to prevent deleterious effects from suction variance, a single venting vacuum locking slot of a predetermined width is defined within the body of the orifice closure valve. the valve height is between one fourth and one half of the valve base diameter, and preferably the cone angle is thirty-three degrees. The slot width is between one thirtieth and one sixteenth of the valve base diameter, and preferably the slot length is between 0.3 and 0.6 of said valve base diameter.

2 Claims, 7 Drawing Figures

FIG. 1
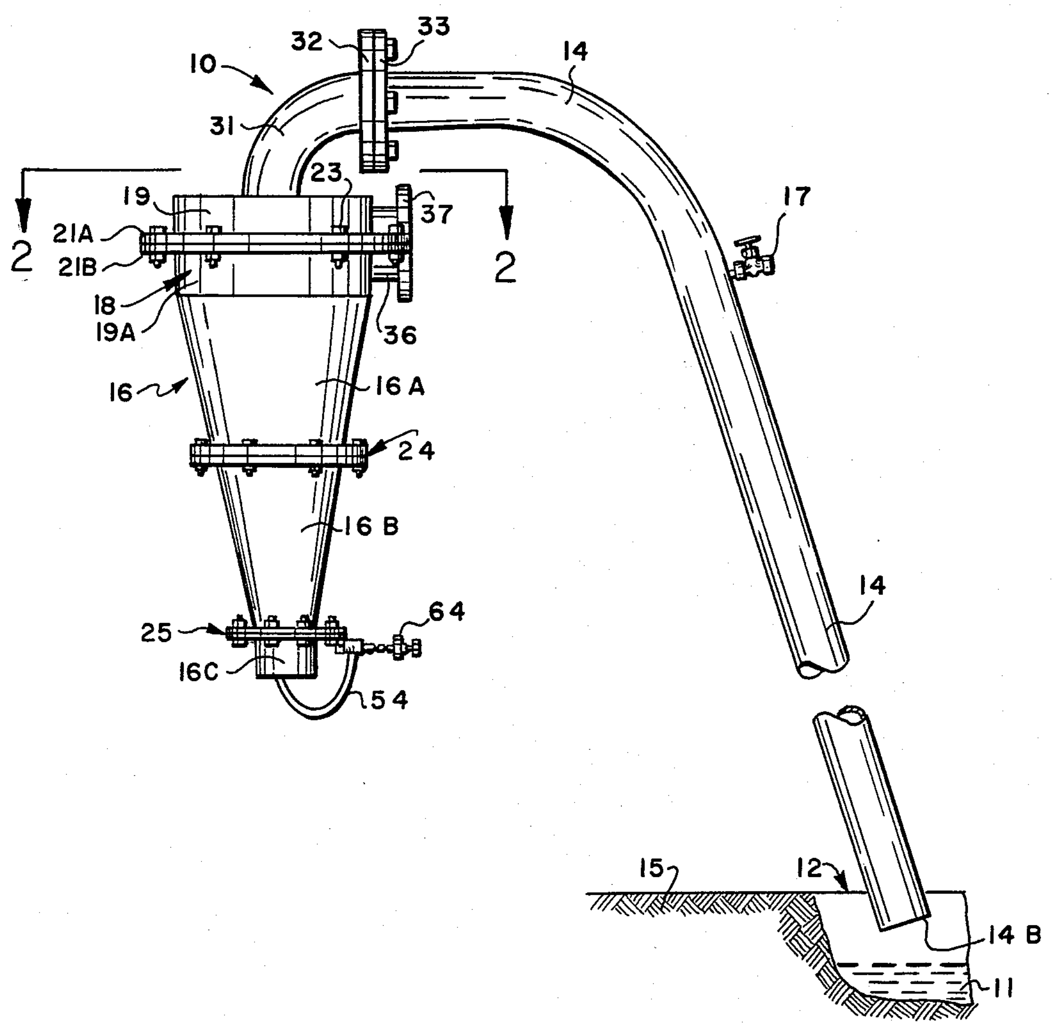
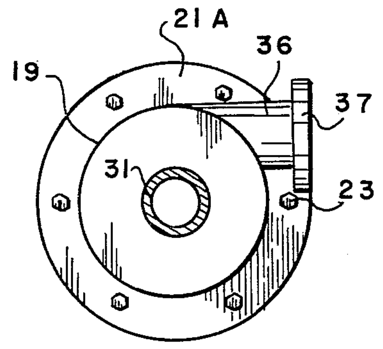
FIG. 2

CENTRIFUGAL SEPARATOR SYSTEM

BACKGROUND OF THE INVENTION

This invention relates broadly to an improved system for cleaning drilling muds. More particularly, the present invention relates to an improved vacuum vent system for use with the valve member in conical separator systems.

In the prior art it is known to provide centrifuge systems for cleaning drilling mud used in oil drilling operations. For example, this technology is generally discussed in U.S. Pat. Nos. 3,243,043 issued Mar. 29, 1966 and 3,213,879 issued on Oct. 26, 1965.

Basically the rotary drilling process employs a drilling mud to bring cuttings recovered during drilling to the surface of the well. Recovered solids include sand, shale, cuttings, and heavy materials, which must be separated from the drilling mud so that the mud may be reused. Drilling mud is comprised of a variety of materials and is extremely expensive, so that reuse is mandated.

In order to separate solids, primarily sand, and other undesireable materials from drilling mud it is known to provide a centrifuge wherein dirty drilling mud is introduced at the top of a conical member under pressure. The mud is introduced tangentially within the upper confines of the generally conical interior, and it is forced into a centrifugal movement. This centrifugal movement creates an interior vacuum, which vacuum draws the cleansed material upwardly out of the apparatus for subsequent delivery to a drilling mud reservoir. Heavier materials drop down to the bottom of the centrifuge, where they may collect on an orifice closure member.

As discussed in the aforementioned patents, the orifice closure member may be biased through a counterweight to yieldably occlude the output until sufficient weight of recovered solids is accumulated so as to open the output and dump the solids. Unless the output is regulated properly vacuum will be destroyed and cleansed mud will drop through the centrifuge and be lost. Therefore, proper regulation of the outflow of solids is necessary to prevent the loss of expensive drilling mud. However, with many known prior art devices blocking or lock-up of the output orifice can occur where surges of vacuum are created during outputting of the purified drilling mud. One approach aimed at solving the vacuum lock-up problem is illustrated by U.S. Pat. No. 2,806,599 issued to Patrick on Sept. 17, 1957. The device described therein includes a vented valve closure member which constantly counteracts vacuum. Practical experience and experimentation with such devices has indicated that an alternative design is necessary. Where, for example, the separator is processing fluids where the sand has substantially been removed, cone lock-up may still occur when the vent becomes blocked in response to build-up of debris.

SUMMARY OF THE INVENTION

The present invention comprises a centrifuge system for cleaning drilling mud, which system incorporates a generally conically shaped housing having an input and two outputs. Dirty drilling mud to be cleansed is introduced under pressure tangentially, resulting in centrifugal motion within the conical interior. The motion of the solids creates a vacuum at the center of the apparatus, which vacuum suction draws lighter material, including the cleansed drilling mud, upwardly outwardly from the apparatus through a discharge pipe. Subsequently, cleansed mud may be recycled from an adjacent recovery reservoir.

Heavier materials will drop downwardly within the conical centrifuge and may contact an orifice closure member which is yieldably biased against an output orifice by a counter balanced pivot arm. As the weight of the solids increases, the orifice closure member may be deflected from the output orifice so as to discharge solids. However, because of the conditions encountered in normal operations, high vacuum within the apparatus may maintain the orifice closure member permanently closed. Therefore, a vacuum slot is defined within the orifice closure member to prevent inadvertent jamming or "vacuum lock". Because of the geometrical configuration of the slot and the valve member in which it is defined, the valve member resists particle buildup, and jamming of the slot is avoided. Hence the problem of vacuum lock is remedied as reliable self-cleaning suction venting has been achieved.

Thus, an object of this invention is to prevent blocking of a centrifuge drilling mud cleaner.

Another object of this invention is to increase the reliabilityof a centrifuge drilling mud cleaner by making it less susceptible to vacuum induced jamming.

Still another object of the invention is to provide a centrifuge cleaning system which will function reliably during a drilling operation notwithstanding operator misuse of the vacuum valve normally employed on the cleansed drilling mud output lines leading to the reservoir tank.

Another object of the invention is to provide an improved centrifuge system for cleaning drilling mud which is equipped with means for preventing deterioration of the expensive liner required therein.

Yet another object of this invention is to provide a centrifugal separator system in conjunction with which drilling mud losses will be minimized.

A still further object of this invention is to increase the reliability of centrifugal separator systems for recovering drilling mud.

Another object is to prevent vacuum lock in centrifuge drilling mud cleaners.

A further object is to provide a balanced discharge cone valve with a self cleaning vacuum venting arrangement.

These and other objects and advantages of this invention, along with features of novelty appurtenant thereto, will appear or become apparent in the course of the following descriptive sections.

BRIEF DESCRIPTION OF THE DRAWINGS

In the appended drawings, which form a part of the specification and which are to be construed in conjunction therewith, and in which like reference numerals have been employed throughout wherever possible to indicate like parts in the various views:

FIG. 1 is an elevational view of a centrifuge constructed in accordance with the teachings of this invention, illustrating a discharge pipe connected to the fluid discharge opening thereof;

FIG. 2 is a top plan view taken generally along line 2—2 of FIG. 1;

DETAILED DESCRIPTION OF THE DRAWINGS

Figure 3:
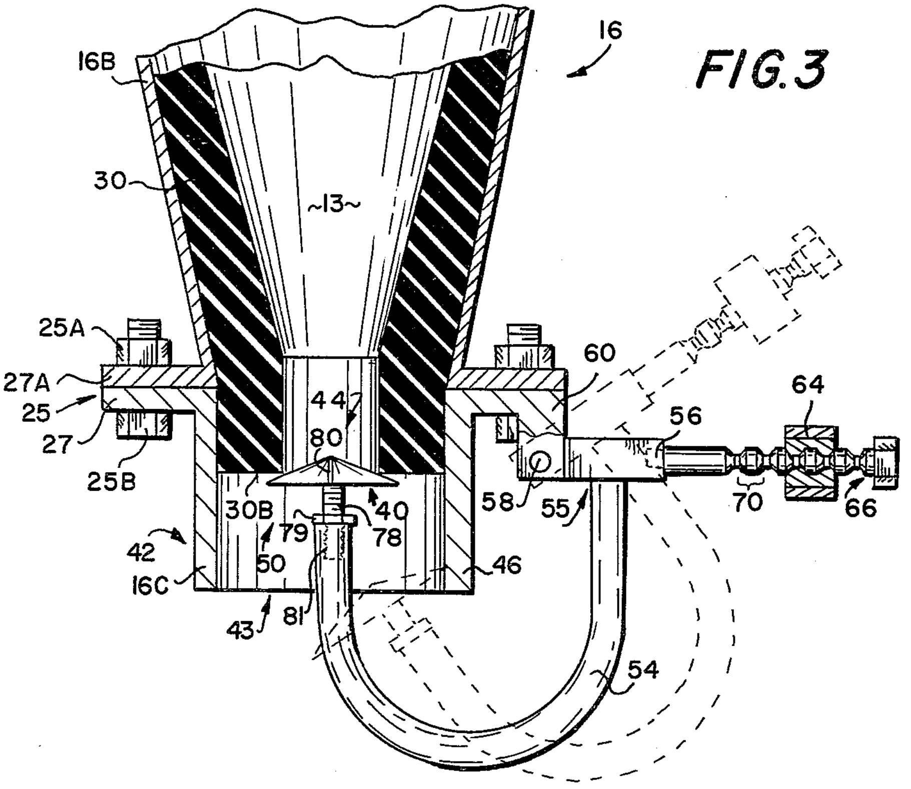
FIG. 3 is an enlarged sectional view of the centrifuge of FIG. 1, with parts thereof broken away for brevity, and with moved positions illustrated in dashed lines.
Figure 4:
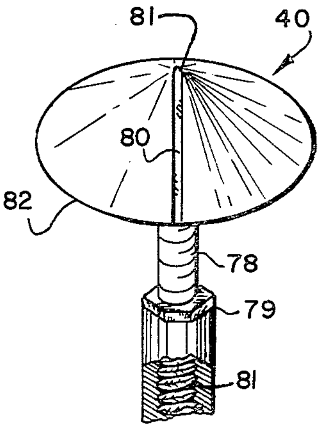
FIG. 4 is an isometric view of an orifice valve closure member constructed in accordance with the teachings of this invention.
Figure 5:
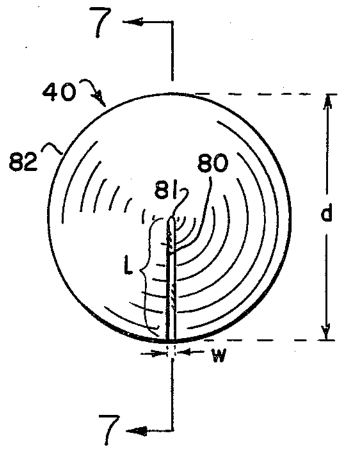
FIG. 5 is a top plan view of the valve member of FIG. 4.
Figure 6:
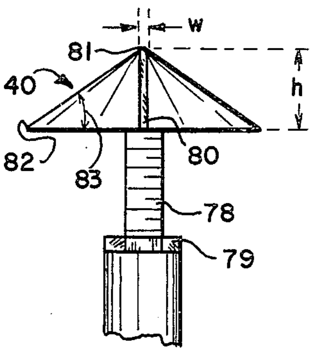
FIG. 6 is a side elevational view of the valve member of FIGS. 4 and 5.
Figure 7:
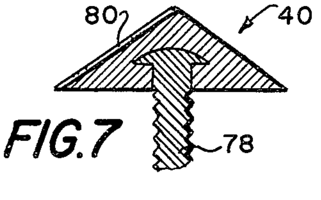
FIG. 7 is a fragmentary section view taken along section line 7—7 in FIG. 5.

With reference now to the appended drawings, a centrifuge constructed in accordance with the teachings of this invention is generally designated by the reference numeral 10. When cleansed, drilling mud 11 will be deposited in a remote reservoir 12 via an output pipe 14.

It will be observed that the apparatus 10, shown in FIG. 1, comprises a generally conical hopper 16, the diameter of which decreases toward the bottom thereof, and an upper, generally cylindrical top portion 18. In practice centrifuge 10 will be comprised of a plurality of flangeably interconnected sections. For example, the upper cylindrical top portion 19 is flangeably interconnected to the lower portion thereof 19A through flanges 21A, 21B coupled together with a plurality of conventional bolts 23. Similarly, flange coupling structure 24 rigidly couples hopper sub-sections 16A and 16B together. Flange structure 25 couples hopper portion 16B to the lowermost segment 16C. Through the construction disclosed, the conical hopper may be quickly disassembled to enable changing of the internal, preferably rubber or plastic liner 30 disposed therein.

The uppermost portion 19 of the hopper is integral with an arcuate pipe 31 which terminates in a flange 32 coupled to flange 33 of output pipe 14. With reference to FIG. 2, dirty drilling fluid is inputted into the upper confines of the apparatus via a tangentially coupled input pipe 36, which delivers dirty mud and the like under pressure to the upper confines of the apparatus. Flange coupling 37 facilitates conventional coupling to external pipes or conduits.

With primary reference now to FIG. 3, it will be apparent that the interior 13 of the hopper is generally of an inverted, frusto-conical shape. As solids are introduced under pressure at the top of the apparatus, the resultant swirling or centrifugal motion creates a vacuum or suction in the center thereof. Suction from siphon output pipe 14 draws the cleansed lighter particles and solids upwardly and outwardly through pipes 31, 14 for outputting into reservoir 12. Heavier substances will fall toward an orifice closure member 40 disposed at the bottom 42 of the apparatus, which yieldably blocks an output passageway 44. In normal operation the output end 14B of pipe 14 should be disposed beneath the ground level 15 and the level of the hopper 16 for proper siphoning action. Sleeve portion 46 of the conical hopper section 16C is integral with flange structure 25, which includes conventional flanges 27, 27A conventionally coupled together with a plurality of nut and bolts 25A, 25B respectively. The waste output end 43 of the hopper is thus defined by sleeve like hopper section 16C. The lowermost, generally cylindrically reduced diameter portion 30B of lining 30 fits coaxially within member 16C. When in the "closed" position illustrated in solid lines (FIG. 3) valve member 40 will block the discharge of materials from passageway 44.

It will be apparent that the closure member 40 is secured to the hooked end 50 of a generally arcuate arm 54, the opposite end 55 of which terminates in a lever 56, which is coupled by pivot 58 to a downwardly depending tab 60 integral with flange 27. Thus the closure member 40 may be deflected toward the moved position illustrated in dashed lines in response to material accumulating thereon. However, a counterweight 64 provided at the outermost end 66 of the arm 56 may be adjusted to alternate positions on grooves 70 preferably provided on the arm to vary the amount of weight which is required to deflect valve 40 to an "open" position.

The closure member 40 is of generally coaxial dimensions, including a lower threaded stem portion 78 which is adapted to be threadably coupled to internally threaded segment 81 of arm 54. Compression nut 79 will secure stem 78 in engagement. Importantly, the valve member is provided with a vacuum vent slot 80 which runs at least a major portion of the length between closure member top 81 and periphery 82. Slot 80 provides a constant vacuum vent within the centrifuge interior 13. In this manner the apparatus will be resistant to vacuum variations encountered in operation. For example, while mud is being purified during transfer between two drilling mud tanks, vacuum lock will be avoided. It will be observed that the conventional valve 17 coupled to siphon output pipe 14 is included to prevent too much suction from developing. Suction problems can develop, for example, when the discharge level of the output pipe 14 is too low with respect to the output of the centrifuge. This valve is usually operated manually during operation of the centrifuge to prevent jamming thereof when the output pipe is too low. However, when operators misuse this valve, the apparatus may become jammed, resulting in semi-permanent closure of the valve member 40. With vent slot 80 problems relating to vacuum will be reduced. Consequently, the rate of deterioration of the liner 30 will be reduced. It will also be apparent that variations in the suction operating point of the apparatus because of the use of slot 80 may be accomodated somewhat by adjustments to counterweights 64.

With primary reference now to FIGS. 4–7, valve slot 80 continuously provides a vent pathway when valve member 40 is in the "closed" position. The resultant velocity of the air streaming through the slot tends to continuously free or un-jam it, and thus waste material collecting on valve member 40 will not block the slot 80. The diameter "d" of valve closure member 40 is nominally 1.5 inches. Height "h" is nominally one-half inch, or approximately one-third the diameter "d". The width "w" of the slot 80 is approximately one twenty-fourth of the valve member diameter, or as illustrated, one sixteenth of an inch. Angle 83 is approximately thirty three degrees. The length L of slot 80 preferably extends at least fifty percent (50%) of the distance between top 81 and periphery 82. Permissible variance in dimensional ratios are as follows:

W: one thirtieth to one sixteenth d;
H: one fourth to one half d;
L: 0.3 to 0.6 d; and,
D: one to three inches.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mechanism for regulating the discharge of solids from a centrifuge having a substantially upright conical housing, the walls of the housing extending downwardly and tapering inwardly forming a discharge opening, said regulating mechanism comprising;

a counterweighted arm means pivotally coupled to said housing;

a generally conically shaped valve means secured to an end of said arm means for closing said discharge opening in said centrifuge when in a closed position; said valve means having a base having a predetermined diameter greater than 1.5 inches and said valve having a height between one fourth and one half of its predetermined diameter, the valve means cone angle being approximately thirty-three degrees;

a single, self cleansing elongated slot means extending from the top of said valve means to said base for constantly venting said centrifuge whereby to prevent jamming thereof, the width of said slot means being between one thirtieth to one sixteenth of said valve means diameter, and said slot means having a length between 0.3 and 0.6 of said valve means base diameter.

2. The combination defined in claim 1 wherein the base diameter of said valve means is approximately three inches.

* * * * *